United States Patent [19]

Wilson et al.

[11] Patent Number: 4,664,707

[45] Date of Patent: May 12, 1987

[54] FIRE RESISTANT GYPSUM COMPOSITION

[75] Inventors: Glenn E. Wilson, Atlanta; Charles W. Lehnert, Stone Mountain, both of Ga.

[73] Assignee: Georgia-Pacific Corporation, Atlanta, Ga.

[21] Appl. No.: 721,524

[22] Filed: Apr. 9, 1985

[51] Int. Cl.$^4$ ............................................. C09D 5/16
[52] U.S. Cl. ................................................. 106/18.11
[58] Field of Search .................. 106/15.05, 18.11; 428/703

[56] References Cited

U.S. PATENT DOCUMENTS

| | | | |
|---|---|---|---|
| 2,526,066 | 10/1950 | Croce | 106/110 |
| 2,681,863 | 6/1954 | Croce et al. | 106/109 |
| 2,744,022 | 5/1956 | Croce et al. | 106/110 |
| 3,616,173 | 10/1971 | Green et al. | 106/110 |
| 3,822,340 | 7/1974 | Eberl et al. | 106/109 |
| 3,839,059 | 10/1974 | Rothfelder et al. | 106/111 |
| 4,152,408 | 5/1979 | Winslow | 106/109 |

FOREIGN PATENT DOCUMENTS

| | | |
|---|---|---|
| 51-080937 | 7/1976 | Japan. |
| 51-37037 | 11/1976 | Japan. |
| 52-063755 | 5/1977 | Japan. |
| 53-061474 | 5/1978 | Japan. |
| 52-048667 | 11/1978 | Japan. |
| 2053874 | 2/1981 | United Kingdom. |

Primary Examiner—Theodore Morris
Attorney, Agent, or Firm—John T. Synnestvedt; Alexis Barron

[57] ABSTRACT

A composition useful as the core of fire resistant gypsum board and comprising a major amount of set calcined gypsum and minor amounts of whisker fibers, glass fibers and clay.

23 Claims, No Drawings

FIRE RESISTANT GYPSUM COMPOSITION

FIELD OF THE INVENTION

This invention relates to an improved fire resistant composition and, more particularly, to a gypsum composition which is capable of being used as the core of fire resistant gypsum board.

Fire resistant gypsum board, commonly used as wall and ceiling partitions, consists of a stiff or rigid core, usually about $\frac{1}{2}$ or about $\frac{5}{8}$ inch thick, sandwiched between two paper liners which form the outer surfaces of the board. The composition of the core of gypsum board is the focus of the present invention.

As its name implies, the main ingredient of the core of gypsum board derives from gypsum, which is a naturally occurring mineral typically found in old salt-lake beds, volcanic deposits and clay beds in the form of calcium sulphate dihydrate ($CaSO_4.2H_2O$). Gypsum is also formed as a by-product of various industrial processes such as, for example, the manufacture of titanium dioxide and the desulfurization of flue gases. Calcining, that is, heating the mineral to about 120° C. drives off $1\frac{1}{2}$ molecules of water, leaving behind calcium sulphate hemihydrate ($CaSO_4.\frac{1}{2}H_2O$). Anhydrous calcium sulfate ($CaSO_4$) can be produced by heating to a temperature of about 163° C. Either of these forms of gypsum, referred to herein as "calcined gypsum", is capable of reacting with water to form calcium sulphate dihydrate, which is referred to herein as "set calcined gypsum". Speaking generally, the core of fire resistant gypsum board is made from an aqueous slurry of calcined gypsum which has set to form a hard, fairly rigid product.

Fire resistant gypsum board must have certain basic properties in order to meet accepted standards which dictate whether the board is suitable for commercial use. Such properties are evaluated in fire resistant assembly tests which have been adaopted by the industry. When exposed to intense heat, such as that generated by fire in a burning building, the board, which is extensively used for constructing walls and ceilings, is expected to stay in place for a defined length of time where it functions to deter the spread of fire. When subjected to standard fire resistant tests which simulate conditions in a burning building, it is not unusual for commercially available fire resistant board to remain in place for one to two hours during which time it is exposed to temperatures as high as 1850° F. In order to perform in this manner, the board core should resist its tendency to shrink under the influence of heat because, as it shrinks, it progressively pulls away from the fasteners and supports to which it is fastened and eventually collapses. This allows the fire to spread and attack adjacent parts of the building. In addition, the core should resist cracking as it is heated and should also exhibit good strength properties at high temperatures. To summarize, fire resistant gypsum board should have good dimensional stability properties and strength at high temperatures.

This invention relates to the provision of improved fire resistant gypsum board made from a unique core formulation.

REPORTED DEVELOPMENTS

There have been a number of developments which have sought to improve the fire resistant properties of gypsum board cores. One of these developments is reported in U.S. Pat. No. 2,526,066 to Croce, which discloses a fire resistant wallboard core comprising set calcined gypsum, unexpanded vermiculite, glass fibers, and/or asbestos fibers. The fibers serve to prevent spalling and cracking of the core as the vermiculite expands when the core is exposed to fire. The expansion of the vermiculite tends to offset the tendency of the gypsum to shrink as the chemically combined water in the gypsum is driven off by heat.

Another development is reported in U.S. Pat. No. 2,681,863 to Croce and Shuttleworth, which discloses gypsum wallboard having enhanced fire resistant properties by virtue of the use of glass fibers which are individually and uniformly distributed throughout the core thereof. Such uniform distribution is achieved by initially adding bundles of short glass fibers which are bonded together by a water soluble or water softenable material, to the aqueous gypsum slurry from which the core is made. As the bonding material dissolves, the glass fibers are distributed evenly throughout the slurry, eliminating the tendency of such fibers to clump and ball up. Evenly distributed in this way, the fibers better reduce the tendency of the wallboard to crack when it is exposed to the heat of a fire.

U.S. Pat. No. 2,744,022 to Croce and Shuttleworth discloses a gypsum wallboard core which includes glass fibers of the type described in the aforementioned U.S. Pat. No. 2,681,863, and unexpanded vermiculite. The combination of unexpanded vermiculite and uniformly distributed glass fibers enhances the resistance of the core to shrinkage and spalling when exposed to fire to a greater extent than the aforementioned glass fiber-only composition.

Yet another development is reported in U.S. Pat. No. 3,454,456 to Willey, which discloses fire resistant wallboard having a core comprising set calcined gypsum and unexpanded vermiculite of a critically defined particle size such that upon exposure to heat the vermiculite expands just enough to compensate for the shrinkage of the gypsum binder. Optional ingredients include mineral fibers, for example, glass and asbestos, and boric acid. Together, the vermiculite and mineral fibers serve to reduce shrinkage and maintain the integrity of the core when it is exposed to fire.

Still another development in this field is reported in U.S. Pat. No. 3,616,173 to Green and Sundberg, which discloses improved fire resistant wallboard having a core comprising set calcined gypsum, glass fibers, clay, and unexpanded vermiculite. The clay cooperates with other constituents of the core to impart thereto improved fire resistant properties by reducing shrinkage and increasing the temperature at which a board subjected to heat will fail.

The novel composition of the present invention provides a gypsum board core having enhanced resistance to cracking and shrinkage at temperatures above which the otherwise reinforcing glass fiber component of the core degrades or melts.

SUMMARY OF THE INVENTION

In accordance with this invention, there is provided an improved fire resistant gypsum composition and, particularly, a composition which can be used to excellent advantage as the core of fire resistant gypsum wallboard and which comprises a major amount of set calcined gypsum and minor amounts of glass fibers, whisker fibers and clay. Compositions for use in the present invention can comprise, for example, about 80 to about 90 wt.% calcined gypsum; about 0.04 to about 1.0 wt.% glass fibers; about 0.1 to about 2.0 wt.% whisker fibers; and about 0.5 to about 5.0 wt.% clay.

Whisker fibers contemplated for use in the present invention include elongate, needle-like crystals of calcium sulfate which are substantially insoluble in water or which can be rendered substantially insoluble in water. In the composition of the present invention, such fibers are dispersed in the set calcined gypsum matrix which comprises the bulk of the fire resistant composition. Thus, they retain their fibrous structure in the end use product.

Important advantages flow from the provision of the present invention. For example, fire resistant wallboard which meets industry-accepted fire resistant tests can be made utilizing whisker fibers, a relatively inexpensive material. The use of whisker fibers also improves the fire resistant properties of the wallboard in that such fibers continue to effectively reinforce the core at temperatures as high as 1900° F., which is about 600° F. higher than the temperature at which glass fibers degrade. Further savings in material costs can be realized from the manufacture of the wallboard core of the present invention by eliminating the use of vermiculite, a commonly used ingredient in conventional fire resistant gypsum wallboard, without sacrificing the fire resistant properties which are expected of commercial wallboard. And such advantages can be achieved by manufacturing gypsum board of the present invention according to conventional techniques utilizing existing equipment.

DETAILED DESCRIPTION OF THE INVENTION

The essential ingredients of the fire resistant gypsum board core of the present invention are set calcined gypsum, glass fibers, clay and whisker fibers.

The ingredient present in the core of the invention in the greatest amount is set calcined gypsum, that is, calcium sulfate dihydrate formed by the hydration of anhydrous calcium sulfate or of calcium sulfate hemihydrate, either of which can be formed by calcining gypsum. Hydration is typically effected from a water slurry containing the calcined gypsum and other ingredients comprising the core in accordance with usual gypsum board manufacturing techniques. The set calcined gypsum functions to bind together the core ingredients in the form of a solid continuous mass.

The calcined gypsum component should not be so alkaline as to have a degrading effect upon the glass fibers of the core composition. In preferred form, a 100 g sample of the calcined gypsum mixed with an equal amount of water forms a mixture which has a pH of about 7 to about 9, most preferably in excess of 7 and less than 9.

The glass fiber component of the gypsum board core functions to reduce cracking and spalling of the core when it is exposed to heat. It is preferred to use drawn textile glass fibers of the type described in aforementioned U.S. Pat. Nos. 2,681,863 and 2,744,022 to Croce and Shuttleworth. The manufacturing and functional improvements and advantages obtained by utilizing such glass fibers relative to blown glass fibers or other natural synthetic fibers are described in the aforesaid Croce/Shuttleworth patents, the disclosures of which, as they relate to the description of the drawn textile glass fibers, are incorporated herein by reference.

Briefly described, the drawn textile glass fibers are produced as continuous individual filaments having a diameter of, for example, about 0.0002 to 0.001 inch. Individual fine filaments are grouped into strands having from 100 to several hundred individual filaments which are protectively coated to prevent abrading between grouped filaments. Preferred glass fiber strands for use in this invention comprise those which have been coated with a relatively weak bonding type material, such as, for example, starch or other water softenable or soluble coating material.

Prior to combining the loosely bonded textile glass fibers with the other components which comprise the core composition, they are preferably cut into short lengths, such as, for example, about ⅛ to about 1 inch, providing short sections or bundles of fibers. Upon adding the short sections or bundles of the fibers to the aqueous slurry composition from which the core of the gypsum board is formed, the bonding or coating material softens or dissolves. As the slurry is mixed, the glass fibers which comprise the bundle are separated into individual filaments which are completely dispersed in the slurry. After the slurry has been allowed to set, there is obtained a core having short, substantially straight, resilient, flexible, individual textile glass filaments distributed randomly therethrough.

The clay component of the gypsum board core improves the core's ability to resist shrinking upon exposure to heat. Examples of clays which can be used in the practice of the present invention are described in aforementioned U.S. Pat. No. 3,616,173 to Green and Sundberg, the disclosure of which, as it relates to clays, is incorporated herein by reference.

Examples of types of clays that can be used are bentonite—comprised mainly of the clay mineral montmorillonite; attapulgite—clays which contain magnesium aluminum silicates; and kaolinitic clays—including for example, kaolin (also referred to as china or paper clays), ball clay, fireclay, and flint clay—which clays are comprised predominately of the clay mineral kaolinite. Other of the various types of clays which contain mixtures of various proportions of clay minerals, such as for example illite, chlorite, kaolinite and montmorillonite, as well as nonclay materials, may also be used. It is preferred to use kaolinitic clays.

The whisker fiber component of the gypsum board core of the present invention comprises needle-like crystals of calcium sulfate which are substantially insoluble in water or which are capable of being rendered substantially insoluble in water. There are two basic differences between the whisker fiber component and the calcined gypsum component from which the core is made. Whisker fibers are generally long and thin, whereas the calcined gypsum component primarily comprises irregularly shaped block-like crystals. Whisker fibers for use in the present invention are substantially insoluble in water or may be rendered so whereas the calcined gypsum component readily rehydrates to form calcium sulfate dihydrate.

The whisker fiber component of the core functions to reduce cracking and spalling of the core when it is exposed to elevated temperatures, including temperatures at which the glass fiber component loses its functional properties as it melts away. In this connection, the whisker fibers can continue to function at temperatures as high as 1900° F. or more which is about 600° F. higher than that at which glass fibers lose their effectiveness.

Whisker fibers are well known in the art. See, for example, the following U.S. Pat. No. 4,152,408 (whisker fibers as reinforcement for organic polymeric resins, hydraulic cements, wood pulp and paper products); No. 4,029,512 (fibrous insoluble calcium sulfate anhydrite as reinforcement for hydraulic cement matrices such as Portland cement and organic polymeric matrices such as polyester and polypropylene); No. 3,961,105 (waterproofed whisker fibers, no disclosed use); and No. 3,822,340 (whisker fibers as replacement for asbestos for insulating and fireproofing of buildings; use in structural units such as beams, sheathing, flooring and the like; as reinforcement for glass fibers; use in a fire resistant 100% whisker fiber molded board product). Additionally, the following publications disclose various types of whisker fibers and applications thereof; U.K. Patent Application No. 2,053,874A (fibrous calcium sulfate useful in construction materials such as panels, heat insulating material, and core material); Japanese Patent Application No. 77-63755 (incombustible gypsum fiberboard comprising a major amount of bulky needle crystals of calcium sulfate hemihydrate, and minor amounts of glass fibers, paper pulp, polyacrylamide and silicon); Japanese Patent Application No. 76-80937 (calcium sulfate hemihydrate needle crystals, no use disclosed); Japanese Patent Application No. 78-61474 (acicular gypsum crystals as reinforcement for thermoplastic resins such as polypropylene); Japanese Patent Application No. 77-48667 (bulky acicular calcium sulfate anhydrite crystals, that is, gypsum whiskers as material for non-flammable building material such as sheeting and boards and as a filler for plastics); and Japanese Patent Application No. 76-137037 (needle-like crystal fibers of calcium sulfate hemihydrate as filler material for synthetic resins, paint lacquer and the like). It is evident from the foregoing that whisker fibers have been used in a wide variety of applications but their use in the core of fire resistant gypsum board, as described herein, has not heretofore been known.

The manufacture of whisker fibers is well known in the art. See, for example, the following U.S. Pat. Nos.: 3,822,340; 3,961,105; 4,029,512; and 4,152,408. Additionally, the following publications disclose the manufacture of "needle crystals" and fibers of calcium sulfate which may also be used in the practice of the present invention: U.K. Patent Application No. 2,053,874 A; and Japanese Patent Application Nos.: 77-63755; 76-80937; 78-61474; 77-48667; and 76-137037.

Generally speaking, whisker fiber manufacture begins by heating an aqueous slurry of calcium sulfate dihydrate (gypsum) under pressure. Whisker fibers usually form from the slurry as elongated thin crystals of calcium sulfate hemihydrate ($CaSO_4.\frac{1}{2}H_2O$), although recovery of whisker fibers in the dihydrate form is reported in aforementioned Japanese Patent Application No. 77-63755. Once recovered, the whisker fibers may be treated further by heating to drive off the remaining chemically bound water. This leads to the formation of soluble anhydrous calcium sulfate whisker fibers. Heating still further renders the fibers insoluble in water. Thus, whisker fibers may be recovered in a dihydrate form ($CaSO_4.2H_2O$), a hemihydrate form ($CaSO_4.\frac{1}{2}H_2O$), a soluble anhydrite form ($CaSO_4$), and an insoluble anhydrite form ($CaSO_4$). Preferred whisker fibers for use in the practice of the present invention are insoluble calcium sulfate anhydrite whisker fibers.

Whisker fibers which are otherwise soluble in water may be coated with various materials which waterproof or otherwise render the coated fibers insoluble in water. Examples of such materials include waxes, hydrolized proteins, and polycarboxylic acids.

Preferred whisker fibers for use in the practice of the present invention are calcium sulfate whisker fibers having: a length to diameter ratio of about 400:1 to about 5:1, preferably about 200:1 to about 10:1, the length to diameter ratio most preferably averaging from about 20:1 to about 30:1; a length of about 10 to about 400 micrometers, preferably about 20 to about 200 micrometers, the length most preferably averaging from about 35 to about 45 micrometers; and a testing consistency of about 100 to about 800 grams of water to about 100 grams whisker fibers, preferably about 200 to about 350 grams of water to about 100 grams whisker fibers.

With respect to optional ingredients of the core of the present invention, vermiculite, which is used in fire resistant wallboard that is widely sold, is such a material. Vermiculite comprises a heat-expandable mineral of volcanic origin which, upon heating, expands in a manner such that it tends to compensate for or offset the inherent shrinkage of the set calcined gypsum component of the core as the chemically combined water of this component is driven off by the heat of a fire. Accordingly, it functions to deter shrinkage of the core and impart dimensional stability to the core as the wallboard is subjected to heat. Ideally, the quantity of vermiculite present in the composition should be such that when it expands it will substantially equal the shrinkage of the set calcined gypsum component as it is heated and as its combined water is driven off.

Although vermiculite can be used in the core of the present invention, it should be considered as an optional ingredient. Evaluations have shown there can be formulated vermiculite-free cores which have excellent fire resistant properties that are at least as good as cores formulated with vermiculite.

Other materials can be included optionally in the core and the formulations from which the core is made to impart desired properties thereto and/or facilitate manufacturing. Some examples of such materials include foaming agents, accelerating agents, dispersing agents, and core adhesives.

The components comprising the core can be mixed according to known methods and gypsum board and the core thereof formed according to known techniques. Speaking generally, this initially involves metering the dry ingredients and water into a mixer and forming an aqueous mixture therefrom. The density of the core can be controlled by adding to the aqueous mixture foam formed from a dilute aqueous solution of a surface active material, for example, ammonium or sodium lauryl sulfonate. The dilute aqueous solution can be foamed utilizing air pressure. The quantity of foam added to the aqueous mixture determines the amount of voids or cells present in the resulting core inasmuch as the foam displaces with air other of the core ingredients to form cells or voids in the core. The foam, water and other ingredients are mixed thoroughly to form a pourable aqueous slurry which is dispensed through one or more outlets at the bottom of the mixer onto a moving facing sheet or cover sheet. Another facing sheet is placed on top of the slurry to sandwich it between two moving facing sheets which are the paper facings of the resultant gypsum board. Facing sheets are usually paper but may also be of non-woven or woven fiberglass mats, plastic scrims and the like.

The thickness of the resultant board is controlled by a forming roll and the edges of the board are formed by appropriate mechanical devices which continuously score, fold and glue the overlapping edges of the facing sheets. Additional guides are used to maintain thickness and width as the "setting" slurry travels on a moving belt. Desired lengths of board are cut in a continuous operation. Evaporation from the core of excess water which is not involved in the hydration of the calcined gypsum is generally accelerated by heating the board.

With respect to the amounts and proportions of ingredients comprising the set composition of the present invention, as mentioned above, calcined gypsum comprises at least 50 wt. % of the set composition, with the other ingredients being present in minor, but functional amounts. In fabricating cores of fire resistant gypsum board in accordance with the present invention, it is recommended that the core comprise the set product of at least about 80 wt. % of calcined gypsum, at least about 0.04 wt. % glass fibers, at least about 0.1 wt. % whisker fibers, and at least about 0.5 wt. % clay. (The term "wt. %" means weight percent based on the total weight of the dry ingredients prior to the addition of water to form a settable slurry.) Recommended ranges of amounts are set forth below.

| Ingredients | Broad Range, wt. % | Preferred Range, wt. % |
| --- | --- | --- |
| calcined gypsum | about 80 to about 90 | about 83 to about 88 |
| glass fibers | about 0.04 to about 1.0 | about 0.1 to about 0.40 |
| whisker fibers | about 0.1 to about 2.0 | about 0.4 to about 1.0 |
| clay | about 0.5 to about 5.0 | about 1.5 to about 3.5 |

If vermiculite is included in the core, it will generally be advantageous to include at least about 0.5 wt. %, for example, about 0.5 to about 1.5 wt. %, and preferably about 0.8 to about 1.2 wt. %. Other additives such as accelerating agents, dispersing agents (for example, sodium lignosulfonate) and core adhesives (for example, corn starch) are generally added in addition to the above ingredients in amounts well-known in the art in order to impart desirable properties to the gypsum board and/or to facilitate the manufacturing thereof. In general, the amounts of such additives generally comprise collectively about 0.5 to about 2.0 wt. % of the core.

Operating within the above parameters, it is possible to form an improved fire resistant gypsum board core having a density of about 44 to about 50 lbs./cu. ft. and the amount and proportion of ingredients comprising the core being such that a core having a thickness of about 0.5 inch has a shrink resistance of no less than about 75% and cracks no more than about 6 inches/24 square inches after heating to about 1800° F. for about 2 hours.

EXAMPLES

Examples which follow are illustrative of the fire resistance properties of various gypsum board cores within the scope of the present invention. Comparative examples are included also. Two fire resistance properties were measured for all core samples tested: shrink resistance and cracking.

Shrink resistance, as used herein, of a gypsum board core is a measure of the percentage of the core's width that remains after a core sample has been heated to a defined temperature over a defined period of time. The extent to which gypsum board resists shrinkage when it is subjected to heat is related to the dimensional stability of its core and is an indication of how long the gypsum board will remain in place before it pulls away from its fasteners and joist supports because of shrinking.

Cracking, as used herein, of a gypsum board core is a measure of the total length of cracks which develop in a core sample heated to a defined temperature over a defined period of time. The extent to which a core cracks when it is subjected to heat is an indication of how well the gypsum board will serve as a barrier to the spread of fire.

In all of the examples which follow, the gypsum, glass fiber, whisker fiber and clay components that were used are as follows:

| COMPONENTS | DESCRIPTION |
| --- | --- |
| calcined gypsum | commercially available calcined gypsum, generally comprising about 90% calcium sulfate hemihydrate and the remaining 10% comprising various impurities such as, for example, limestone, shale, sand and clay |
| glass fibers | strands of drawn textile glass fibers, the fibers having a diameter of about 0.00065 to about 0.0007 inch, the strands having a length of about 0.5 inch and loosely bonded together by starch and sold by Owens Corning Fiberglass |
| whisker fibers | insoluble calcium sulfate anhydrite whisker fibers having a length to diameter ratio within the range of about 200:1 to about 10:1, a length within the range of about 20 to about 200 micrometers and a test consistency of about 200 to about 350 ml of water per 100 grams of whisker fibers |
| clay | ASP 602, a water washed kaolin clay having an average particle size of 0.8 micron, a specific gravity of 2.58, and sold by Minerals and Chemical Phillip Corporation of America |

In particular, tests to determine shrink resistance and cracking were conducted by preparing core samples having a length of 8 inches, a width of 3 inches and a thickness of ½ inch. Samples were prepared by mixing the dry components comprising the core, adding the premixed components to a quantity of water sufficient to achieve a core density of about 46 lbs. per cubic foot, and then mixing for one minute with mechanical agitation. The resulting mixture was poured into a mold and when sufficiently hardened, the cast was removed from the mold and cut into four samples, each of which was 3 inches wide, 8 inches long and ½ inch thick. After being thoroughly dried at 110° F., the four samples cut from the cast were positioned within a muffle furnace, each sample being placed upright therein on its 8-inch long, ½-inch thickness edge in such a way that the samples did not touch each other and roughly defined the sides of an 8-inch by 8-inch square.

The oven and samples were at room temperature when the samples were placed therein. The furnace was then turned on and set to 1800° F. After two hours, the furnace was turned off and allowed to cool undisturbed until the next day. The samples were then removed and evaluated for shrinkage and cracking.

Shrink resistance was determined by measuring the width of each sample after heating as described above, and calculating the percent width remaining. Length was not used to calculate percent reduction because cracks which developed in the samples in response to heating were observed to run across the width of a sample. This causes an apparent reduction in shrinkage by increasing sample length.

Cracking was determined by measuring the length of each crack in a given sample and calculating the total length of the cracks by summing the lengths of each of the cracks. Cracks of ¼ inch or less were not measured.

Mean shrink resistance and cracking values are set forth in the table below for the core compositions of Example Nos. 1 to 8 which are illustrative of the invention. The same type values are set forth in the table for the comparative core compositions of Example Nos. 1-C to 4-C. All values expressed represent the average of values from 4 samples. The density of each of the cores of the examples was approximately 46 lb/cu. ft.

| Example No. | CORE INGREDIENTS, wt. % | | | | TEST VALUES | |
|---|---|---|---|---|---|---|
| | Calcined Gypsum | Glass Fibers | Whisker Fibers | Clay | Shrink Resistance (%) | Cracking (inches) |
| 1-C | 100 | 0 | 0 | 0 | 73.5 ± 1.0 | 10.1 ± 1.8 |
| 2-C | 99.78 | 0.22 | 0 | 0 | 71.5 ± 1.0 | 6.9 ± 1.8 |
| 3-C | 99.12 | 0 | 0.88 | 0 | 72.5 ± 1.0 | 6.7 ± 1.8 |
| 4-C | 99.5 | 0.1 | 0.4 | 0 | 72 ± 1.0 | 6.0 ± 1.8 |
| 1 | 99.27 | 0.05 | 0.14 | 0.54 | 73 ± 1.7 | 7.6 ± 2.7 |
| 2 | 99.09 | 0.22 | 0.14 | 0.55 | 73 ± 1.7 | 4.0 ± 2.7 |
| 3 | 97.61 | 0.05 | 0.14 | 2.2 | 83 ± 1.7 | 7.7 ± 2.7 |
| 4 | 97.44 | 0.22 | 0.14 | 2.2 | 84 ± 1.7 | 1.4 ± 2.7 |
| 5 | 98.85 | 0.05 | 0.55 | 0.55 | 74 ± 1.7 | 3.9 ± 2.7 |
| 6 | 98.68 | 0.22 | 0.55 | 0.55 | 71 ± 1.7 | 2.7 ± 2.7 |
| 7 | 97.21 | 0.05 | 0.54 | 2.2 | 82 ± 1.7 | 2.0 ± 2.7 |
| 8 | 97.03 | 0.22 | 0.55 | 2.2 | 80 ± 1.7 | 1.3 ± 2.7 |

As the foregoing examples illustrate, the best shrink resistance and least cracking was attained in those core samples tested which contained calcined gypsum, glass fibers, whisker fibers and clay.

The example which follows is illustrative of a preferred fire resistant gypsum board core formulation.

EXAMPLE 9

A core of fire resistant gypsum board illustrative of a preferred formulation of the invention and having a density of about 46 lbs./cu. ft. and a board weight of about 1850 lbs./sq. ft. may be prepared from the set product of the following components (of the same description as set forth for the preceding examples) in the amounts indicated.

| | Wt. % |
|---|---|
| Calcined gypsum | about 94.9; |
| glass fibers | about 0.2; |
| whisker fibers | about 0.5; |
| clay | about 3.3; |
| dispersing agent (sodium lignosulfonate) | about 0.1; |
| foaming agent (sodium lauryl sulfonate) | about 0.5; and |
| core adhesive (corn starch) | about 0.5. |

To summarize, the incorporation of relatively inexpensive calcium sulfate whisker fibers in gypsum compositions provides a gypsum board core having enhanced resistance to shrinkage and cracking at temperatures above which boards reinforced with glass fibers only fail. Material cost savings are further realized by eliminating vermiculite, a commonly used ingredient in gypsum boards used as conventional fire resistant wallboard. These advantages are achieved in the manufacture of fire resistant gypsum board of the instant invention utilizing existing equipment according to conventional techniques.

We claim:

1. A core of fire-resistant gypsum board comprising the set product of at least about 80 wt.% of calcined gypsum, at least about 0.04 wt.% glass fibers, at least about 0.1 wt.% whisker fibers and at least about 1.5 wt.% clay.

2. A core according to claim 1 comprising the set product of:

| | Wt. % |
|---|---|
| calcined gypsum | about 80 to about 90; |
| glass fibers | about 0.04 to about 1.0; |
| whisker fibers | about 0.1 to about 2.0; and |
| clay | about 1.5 to about 5.0. |

3. A core according to claim 1 comprising the set product of:

| | Wt. % |
|---|---|
| calcined gypsum | about 83 to about 88; |
| glass fibers | about 0.1 to about 0.4; |
| whisker fibers | about 0.4 to about 1.0; and |
| clay | about 1.5 to about 3.5. |

4. A core according to claim 1 and having a density of about 44 to about 50 lbs./cu. ft., the amounts and proportions of ingredients comprising the core being such that a core having a thickness of about 0.5 inch has a shrink resistance of no less than 75% and cracks no more than 6 inches/24 sq. in. after heating to about 1800° F. for about 2 hours.

5. A core according to any of claims 1, 2, 3 or 4, wherein said whisker fibers are water insoluble calcium sulfate anhydrite.

6. A core according to claim 1 wherein said whisker fibers have a testing consistency of about 100 to about 800 grams of water per 100 grams of whisker fibers and a length to diameter ratio of about 400:1 to about 5:1.

7. A core according to claim 6 wherein said whisker fibers have an average length to diameter ratio of about 20:1 to about 30:1.

8. A core according to claim 1 wherein said whisker fibers have a length of about 10 to about 400 micrometers.

9. A core according to claim 8 wherein said whisker fibers have an average length of about 35 to about 45 micrometers.

10. A core according to claim 1 wherein said whisker fibers have a testing consistency of about 200 to about 350 grams of water to 100 grams of fibers and a length to diameter ratio of about 200:1 to about 10:1.

11. A core according to claim 10 wherein said whisker fibers have a length of about 20 to 200 micrometers.

12. A core according to claim 1 which is substantially free from heat expandable minerals.

13. A core according to claim 1 including at least about 0.5 wt. % vermiculite.

14. A core according to claim 2 including about 0.5 to about 1.5 wt. % vermiculite.

15. A core according to claim 3 including about 0.8 to about 1.2 wt. % vermiculite.

16. A core according to claim 1 wherein the clay is kaolin clay.

17. A process for making a core of gypsum board comprising preparing a mixture of water, a major amount of calcined gypsum and minor amounts of glass fibers, whisker fibers and clay, and forming and setting said mixture into said core, wherein on a dry basis, said mixture comprises at least about 80 wt.% of said calcined gypsum, at least about 0.04 wt.% of said glass fibers, at least about 0.1 wt.% of said whisker fibers, and at least about 1.5 wt.% of said clay.

18. The process of claim 17, wherein the whisker fibers are water insoluble calcium sulfate anhydrite having a length to diameter ratio of about 400:1 to about 5:1, a testing consistency of about 100 to about 800 grams of water to about 100 grams of whisker fibers, and a length of about 10 to about 400 micrometers.

19. The process of claim 17, wherein the whisker fibers have a length to diameter ratio of about 200:1 to about 10:1, a testing consistency of about 200 to about 350 grams of water to about 100 grams of whisker fibers and a length of about 20 to 200 micrometers.

20. The process of claim 19, wherein the whisker fibers have an average length to diameter ratio of about 20:1 to about 30:1 and an average length of about 35 to about 45 micrometers.

21. A core according to claim 2 having a density of about 44 to about 50 lbs./cu. ft., the amounts and proportions of ingredients comprising the core being such that a core having a thickness of about 0.5 inch has a shrink resistance of no less than 75% and cracks no more than 6 inches/24 sq. in. after heating to about 1800° F. for about 2 hours.

22. A core according to claim 21 comprising the set product of:

|  | Wt. % |
| --- | --- |
| calcined gypsum | about 83 to about 88; |
| glass fibers | about 0.1 to about 0.4; |
| whisker fibers | about 0.4 to about 1.0; and |
| clay | about 1.5 to about 3.5. |

23. A core according to claim 21 or 22 wherein said whisker fibers are water insoluble calcium sulfate anhydrite having a testing consistency of about 100 to about 800 grams of water per 100 grams of whisker fibers and a length to diameter ratio of about 400:1 to about 5:1.

* * * * *